(12) United States Patent
Chang (10) Patent No.: US 11,482,882 B2
(45) Date of Patent: Oct. 25, 2022

(54) ELECTROMAGNETIC WAVE SHIELDING FILM HAVING WIRELESS ENERGY CONVERSION FUNCTION

(71) Applicant: NANJING SILERGY MICRO (HK) CO., LIMITED, Hong Kong (HK)

(72) Inventor: Chia-Lin Chang, Taipei (TW)

(73) Assignee: NANJING SILERGY MICRO (HK) CO., LIMITED, Hong Kong (HK)

( * ) Notice: Subject to any disclaimer, the term of this patent is extended or adjusted under 35 U.S.C. 154(b) by 235 days.

(21) Appl. No.: 17/021,318

(22) Filed: Sep. 15, 2020

(65) Prior Publication Data

US 2021/0410239 A1 Dec. 30, 2021

(30) Foreign Application Priority Data

Jun. 24, 2020 (TW) .................................. 109121659

(51) Int. Cl.
| | | |
|---|---|---|
| H01F 27/42 | (2006.01) | |
| H01F 37/00 | (2006.01) | |
| H01F 38/00 | (2006.01) | |
| H02J 50/00 | (2016.01) | |
| H05B 6/64 | (2006.01) | |
| H02J 50/20 | (2016.01) | |
| H02J 50/40 | (2016.01) | |

(52) U.S. Cl.
CPC ............ *H02J 50/001* (2020.01); *H02J 50/20* (2016.02); *H02J 50/402* (2020.01); *H05B 6/645* (2013.01); *H05B 6/6414* (2013.01)

(58) Field of Classification Search
CPC ........ H02J 50/001; H02J 50/20; H02J 50/402; H02J 50/005; H05B 6/645; H05B 6/766; H05B 6/6414; G02F 1/163
See application file for complete search history.

(56) References Cited

U.S. PATENT DOCUMENTS

| | | | |
|---|---|---|---|
| 2018/0077763 A1* | 3/2018 | Schneider | H05B 6/66 |
| 2020/0259237 A1* | 8/2020 | Shrivastava | G02F 1/163 |
| 2021/0126348 A1* | 4/2021 | Kim | H01Q 1/38 |

* cited by examiner

*Primary Examiner* — Rexford N Barnie
*Assistant Examiner* — Rasem Mourad
(74) *Attorney, Agent, or Firm* — Amin, Turocy & Watson, LLP (57) ABSTRACT

An electromagnetic wave shielding film having a wireless energy conversion function is disclosed, which is attached to an exterior surface of the door of a microwave oven and used to absorb electromagnetic waves released by the microwave oven during operation. The electromagnetic wave shielding film comprises: a substrate carrier; a first substrate layer, provided on one side of the substrate carrier, where a wireless energy conversion unit is provided in the first substrate layer and is used to receive the electromagnetic waves and covert the electromagnetic waves to DC electrical energy; and an optically variable assembly, provided on the other side of the substrate carrier, where the optically variable assembly comprises an electrochromic layer and an electrode layer; the electrode layer is used to receive the DC electrical energy from the wireless energy conversion unit and drive the electrochromic layer to change its light transmission property.

17 Claims, 10 Drawing Sheets

ELECTROMAGNETIC WAVE SHIELDING FILM HAVING WIRELESS ENERGY CONVERSION FUNCTION

CROSS REFERENCE TO RELATED APPLICATIONS

The present claims the benefit of Taiwanese Patent Application No. 109121659 filed on Jun. 24, 2020, the contents of which are incorporated herein by reference in their entirety.

BACKGROUND OF THE INVENTION

1. Field of the Invention

The invention relates to an electromagnetic wave shielding device, and more particularly to an electromagnetic wave shielding film having a wireless energy conversion function.

2. Description of the Related Art

With the busy life of modern society, more and more people choose to use a time-saving and convenient microwave oven to heat food, making the microwave oven become one of the necessities in daily life. The microwave oven heats food by converting electrical energy into microwave radiation which produces high energy to generate heat by friction of water molecules in the food. Due to high frequency and permeability of microwaves, the food can be heated quickly and efficiently. However, the microwave oven releases a minute amount of electromagnetic waves to the surrounding environment during operation, such that a user has worries about the adverse effect of the released waves on his/her health. In addition, if looking directly at the light emitted by the microwave oven in operation, the user has a risk of cataracts.

Therefore, specialists or microwave oven suppliers mostly recommend keeping a particular distance from the microwave oven during its operation. Moreover, anti-electromagnetic wave isolation cloth emerges in the market, and it is claimed that this cloth can effectively block the electromagnetic waves when placed outside the door of the microwave oven. However, such anti-electromagnetic wave isolation cloth can only shield the electromagnetic waves but fails to recycle the energy. Further, the cloth covers the door of the microwave oven after being placed, such that the user cannot know whether there is an operation anomaly inside the microwave oven.

SUMMARY OF THE INVENTION

In view of this, the present invention aims to provide an electromagnetic wave shielding film having a wireless energy conversion function, which can be directly attached to the exterior surface of the door of a microwave oven. The electromagnetic wave shielding film is used to receive electromagnetic waves from the microwave oven and convert electromagnetic energy of the electromagnetic waves to direct current (DC) electrical energy, such that electrical energy can be frequently acquired from the electromagnetic waves emitted by the microwave oven during its operation. In addition, the electromagnetic wave shielding film of the present invention can display an operation status inside the microwave oven, such that a user can confirm whether the microwave oven operates normally.

In other words, the present invention provides an electromagnetic wave shielding film having a wireless energy conversion function, which is attached to the exterior surface of the door of the microwave oven and used to absorb electromagnetic waves released by the microwave oven during operation. The electromagnetic wave shielding film includes: a substrate carrier having a first light transmittance; a first substrate layer, provided on one side of the substrate carrier and having a second light transmittance, where a wireless energy conversion unit is provided in the first substrate layer and is used to receive the electromagnetic waves and covert the electromagnetic waves to DC electrical energy; and an optically variable assembly, provided on the other side of the substrate carrier and electrically connected to the wireless energy conversion unit, where the optically variable assembly includes an electrochromic layer and an electrode layer; and the electrode layer is electrically connected to the wireless energy conversion unit and the electrochromic layer, and is used to receive the DC electrical energy from the wireless energy conversion unit and drive the electrochromic layer to change its light transmission property, where the wireless energy conversion unit includes an antenna assembly and an electrical energy processing module; the antenna assembly is formed by a plurality of antenna units capable of transmitting and receiving the electromagnetic waves; the antenna units are arranged in an array and each include an energy receiving portion, a grounding portion, and a wiring portion which are disposed in the first substrate layer; the energy receiving portion is formed by arranging a first metal line layer, and the grounding portion is disposed around the energy receiving portion and formed by arranging a second metal line layer; the electrical energy processing module includes a rectifier filter and a DC power supply portion; the rectifier filter is electrically connected to the energy receiving portion of the antenna assembly, and is used to receive the electromagnetic waves from the antenna assembly and implement rectification and filtering on the electromagnetic waves to convert the waves to DC electrical energy; the DC power supply portion is formed by arranging a third metal line layer, is electrically connected to the rectifier filter and the optically variable assembly, and is used to receive the DC electrical energy and output it to the optically variable assembly; the wiring portion in the antenna assembly is distributed between the energy receiving portion and the grounding portion and in the remaining region not containing the energy receiving portion, the grounding portion, and the DC power supply portion; the wiring portion includes a plurality of conductor elements; these conductor elements keep a first distance from each other to be mutually insulated, and further keep a second distance from the energy receiving portion, the grounding portion, and the DC power supply portion to be mutually insulated; and the second light transmittance ranges from 50% to 95%, and the second light transmittance and the first light transmittance meet the following relational expression:

$$-10\% \leq T1-T2 \leq +10\%.$$

According to an embodiment of the present invention, the electromagnetic wave shielding film further includes a real-time display unit electrically connected to the wireless energy conversion unit, where the real-time display unit includes a display module and a sensing module; the sensing module is used to sense the temperature inside the microwave oven, capture a real-time interior image of the microwave oven, and transmit the image to the display module for real-time display.

According to an embodiment of the present invention, the real-time display unit further includes a microcontroller and a wireless transceiver module; and the microcontroller is used to receive the temperature information measured by the sensing module, and control operation of the microwave oven by a communicative connection between the wireless transceiver module and the microwave oven.

According to an embodiment of the present invention, the first metal line layer, the second metal line layer, and the third metal line layer which respectively form the energy receiving portion, the grounding portion, and the DC power supply portion have equal fixed or mutually unequal widths.

According to an embodiment of the present invention, the first metal line layer, the second metal line layer, and the third metal line layer which respectively form the energy receiving portion, the grounding portion, and the DC power supply portion crisscross to respectively form square grids having equal or unequal side lengths.

According to an embodiment of the present invention, the first distance between the conductor elements progressively increases cumulatively by an equal length from any of the energy receiving portion, the grounding portion, and the DC power supply portion to outer edges of the substrate carrier.

According to an embodiment of the present invention, the antenna assembly includes m antenna units, and the electrical energy processing module includes m rectifier filters; the energy receiving portions in the antenna units and the DC power supply portions of the electrical energy processing module are separately connected to the rectifier filters in series or in parallel, to output power to the optically variable assembly; and m≥2.

According to an embodiment of the present invention, the energy receiving portion, the grounding portion, the DC power supply portion, and the wiring portion are together provided in the first substrate layer and none of them contacts the substrate carrier.

According to an embodiment of the present invention, the energy receiving portion, the grounding portion, the DC power supply portion, and the wiring portion are together disposed in the first substrate layer and all contact the substrate carrier.

According to an embodiment of the present invention, an upper surface side and a lower surface side of the substrate carrier are respectively provided with the first substrate layer; and the energy receiving portion, the DC power supply portion, and the wiring portion of the antenna unit are together disposed in the first substrate layer on the upper surface side, while the grounding portion is disposed in the first substrate layer on the lower surface side.

According to an embodiment of the present invention, none of the energy receiving portion, the DC power supply portion, and the wiring portion disposed at the upper surface side contacts the substrate carrier, and neither does the grounding portion disposed at the lower surface side.

According to an embodiment of the present invention, the energy receiving portion, the DC power supply portion, and the wiring portion disposed at the upper surface side all contact the substrate carrier, and so does the grounding portion disposed at the lower surface side.

According to an embodiment of the present invention, the first metal line layer, the second metal line layer, and the third metal line layer are made from any of indium tin oxide (ITO), graphene, nano-silver paste, copper wires, and silver alloy; the substrate carrier and the first substrate layer are made from glass, polyethylene terephthalate (PET), or a polyimide (PI) thin film; and the first substrate layer is attached to the substrate carrier via an optical clear adhesive (OCA).

According to an embodiment of the present invention, the first substrate layer has a thickness ranging from 0.05 mm to 2 mm; and the first metal line layer, the second metal line layer, and the third metal line layer separately have a sheet resistance of less than 2 ohms.

According to an embodiment of the present invention, the first substrate layer is made from glass and has a plurality of grooves formed by means of physical or chemical etching; and the first metal line layer, the second metal line layer, and the third metal line layer are generated in these grooves by means of physical or chemical deposition to respectively form the energy receiving portion, the grounding portion, and the DC power supply portion.

According to an embodiment of the present invention, the electromagnetic wave shielding film further includes a second substrate layer having the first light transmittance, where the second substrate layer is provided on the outermost side of the electromagnetic wave shielding film and meets the pencil hardness specification of greater than 5H, so as to protect the internal components of the electromagnetic wave shielding film against scratching or abrasion.

According to an embodiment of the present invention, the energy receiving portion further includes a signal feed-in portion which is a part, of the first metal line layer, straightly extending to an edge of the first substrate layer.

According to an embodiment of the present invention, the energy receiving portion further includes a resonant filtering circuit, which is provided in the first metal line layer and used to enable the energy receiving portion to filter out harmonics while radiating energy.

According to an embodiment of the present invention, the resonant filtering circuit has a structure of a step-impedance resonator (SIR) and is used to filter out second-order or third-order harmonics.

According to an embodiment of the present invention, the substrate carrier is of a flat-plate structure, and the antenna assembly is a flat antenna unit fed by coplanar waveguide (CPW).

According to an embodiment of the present invention, the wireless energy conversion unit further includes an electrical energy storage module connected to the DC power supply portion, and the electrical energy storage module is used to store the electrical energy obtained after conversion of the electromagnetic waves received by the antenna assembly.

DETAILED DESCRIPTION OF THE PREFERRED EMBODIMENTS

To clearly understand the technical features, objectives, and effects of the present invention, specific implementations of the present invention are described in detail below with reference to the accompanying drawings. The detailed description and technical content of the present invention are described below with reference to the accompanying drawings as follows. However, the accompanying drawings are merely used for reference and explanation, and not intended to limit the present invention. The foregoing and other technical contents, features, and effects of the present invention will be clearly presented in the following detailed description of embodiments with reference to the accompanying drawings. The directional terms mentioned in the following embodiments, such as "above", "below", "left", "right", "front", "rear", etc., are given only with reference to the directions in the accompanying drawings. Therefore, the directional terms are used for illustration only, and are not intended to limit the present invention. Moreover, in the following embodiments, the same or similar elements are denoted by the same or similar numerals.

Figure 1:
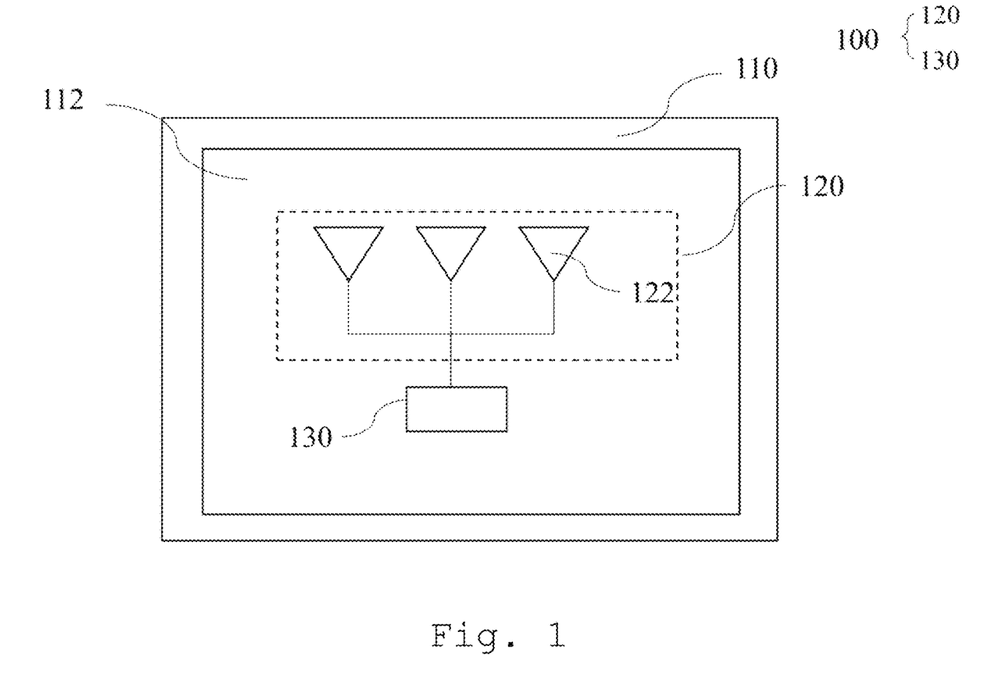
FIG. 1 is a schematic configuration diagram of an electromagnetic wave shielding film having a wireless energy conversion function in the present invention.
Figure 2A:
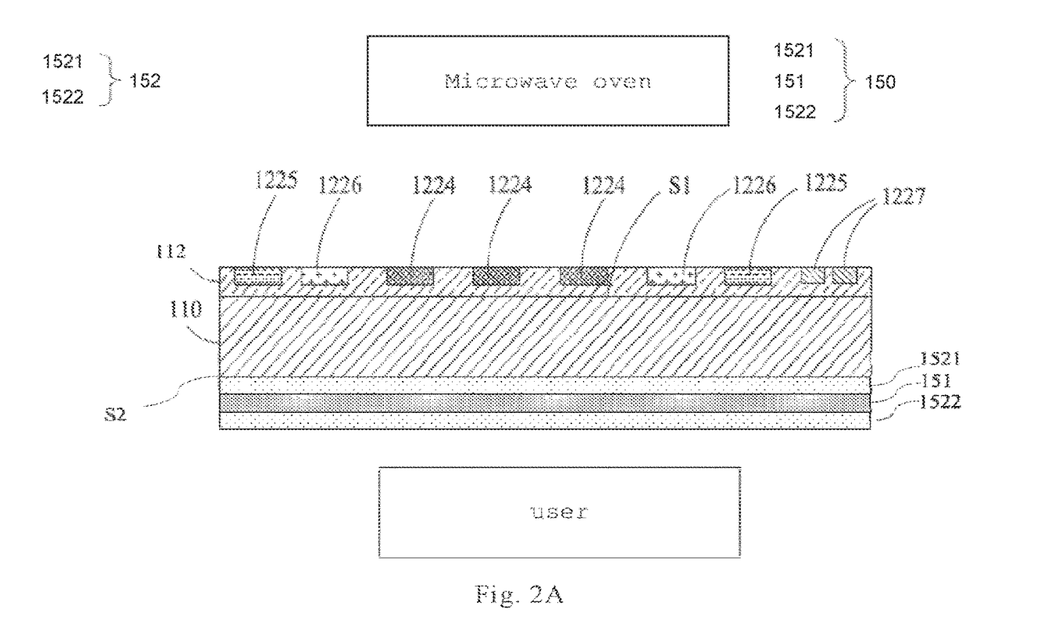
FIG. 2A is a schematic top-view structural diagram of the electromagnetic wave shielding film having a wireless energy conversion function in the present invention.

Refer to FIGS. 1 and 2A, which are respectively a schematic configuration diagram and a schematic top-view structural diagram of an electromagnetic wave shielding film having a wireless energy conversion function in the present invention. In this embodiment, the electromagnetic wave shielding film includes a substrate carrier 110, a first substrate layer 112, and an optically variable assembly 150, where a wireless energy conversion unit 100 is provided in the first substrate layer 112.

Specifically, the electromagnetic wave shielding film is a multi-layer structure formed by at least the substrate carrier 110, the first substrate layer 112, and the optically variable assembly 150. The first substrate layer 112 and the optically variable assembly 150 are provided respectively on opposite side surfaces of the substrate carrier 110. The wireless energy conversion unit 100 in the first substrate layer 112 includes an antenna assembly 120 and an electrical energy processing module 130, and the optically variable assembly 150 is electrically connected to the electrical energy processing module 130.

The substrate carrier 110 has a first light transmittance T1, and has an electrically active region and a non-electrically active region. The first substrate layer 112 has a second light transmittance T2 which ranges from 50% to 95%. A difference value (T1−T2) between the second light transmittance T2 and the first light transmittance T1 ranges from −10% to +10%, and preferably ranges from −5% to +5%.

The antenna assembly 120 in the wireless energy conversion unit is formed by a plurality of antenna units 122 arranged in an array. The antenna units 122 are generated in the first substrate layer 112 by means of physical or chemical deposition; and used to receive electromagnetic waves from a microwave oven or the external environment and transmit the electromagnetic waves to the electrical energy processing module 130. The electrical energy processing module 130 can convert the electromagnetic waves to DC electrical energy for the optically variable assembly 150 to operate. Therefore, during application of the electromagnetic wave shielding film of the present invention, the first substrate layer 112 is preferably disposed to face the door of the microwave oven, so as to enhance absorption efficiency of the electromagnetic waves; and the optically variable assembly 150 is disposed to face a user.

Further, the optically variable assembly 150 includes an electrochromic layer 151 and an electrode layer 152. The electrode layer 152 is electrically connected to the electrical energy processing module 130 and the electrochromic layer 151, and can receive the electrical energy transmitted from the wireless energy conversion unit 100 to drive the electrochromic layer 151 to change optical properties of transmitted light, for example, to change the wavelength or transmittance, namely, to adjust the color or brightness of the transmitted light.

As shown in FIG. 2A, in this embodiment, the substrate carrier 110 has a first surface S1 and a second surface S2 which are opposite. The first substrate layer 112 and the optically variable assembly 150 are respectively disposed on the first surface S1 and the second surface S2. The electrode layer 152 includes a first electrode 1521 and a second electrode 1522 which are electrically connected to the electrical energy processing module 130. The electrochromic layer 151 is sandwiched between the first electrode 1521 and the second electrode 1522. The electrical energy processing module 130 transmits the electrical energy to the first electrode 1521 and the second electrode 1522 which then apply a voltage to the electrochromic layer 151, such that the electrochromic layer 151 is changed in color. In this embodiment, the change in color also includes a change in light transmittance of the electrochromic layer 151. For example, before the voltage is applied, the optically variable assembly 150 has a light transmittance of preferably above 90%. After the voltage is applied, the light transmittance thereof generally ranges from 15% to 60%, and preferably ranges from 30% to 60%, reducing the harm brought by the light emitted by the microwave oven.

Figure 2B:
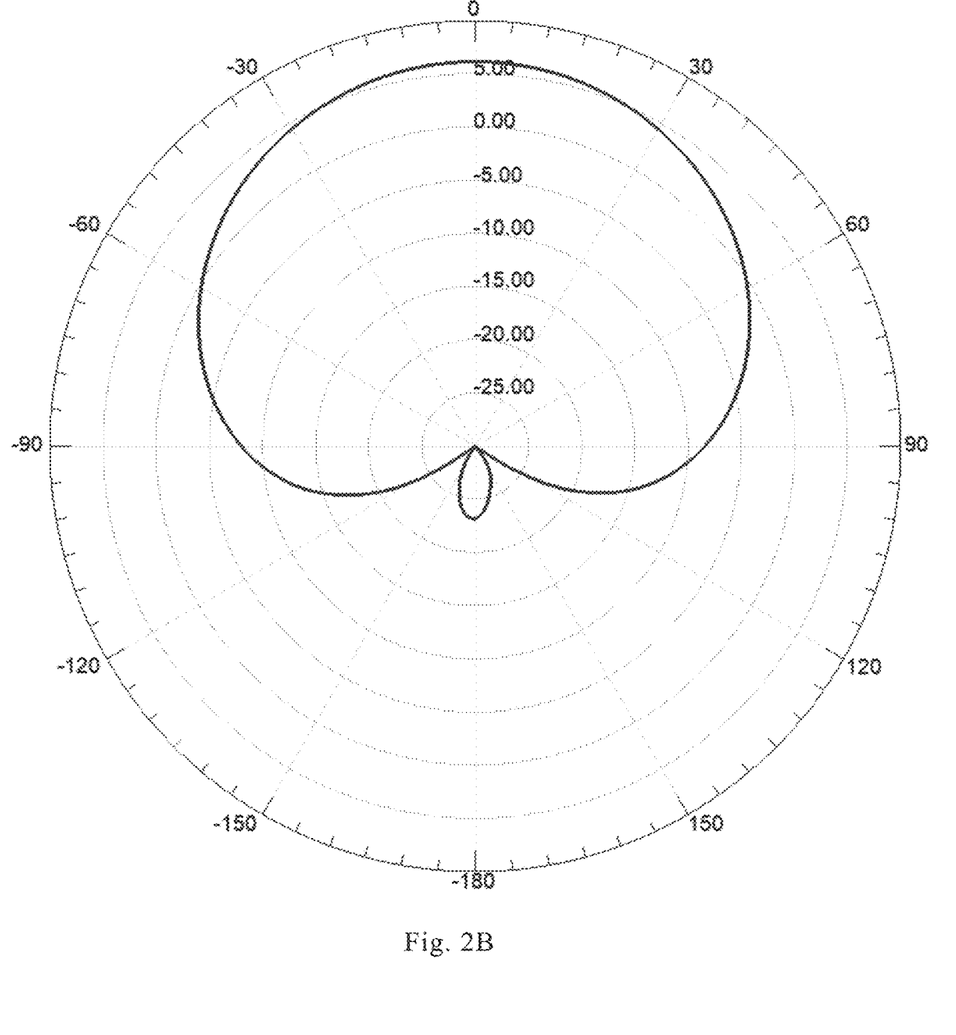
FIG. 2B is a diagram showing a radiation pattern during operation of the electromagnetic wave shielding film based on FIG. 2A.

In addition, the first electrode 1521 of the electrode layer 152 is capable of reflecting the electromagnetic waves. As shown in FIG. 2B, FIG. 2B is a diagram showing a radiation pattern during operation of the electromagnetic wave shielding film of the present invention. The first electrode 1521 can serve as a reflection surface of the antenna assembly 120, such that the electromagnetic waves emitted by the microwave oven can be highly concentrated towards the antenna assembly 120, thus reducing an amount of radiation emitted from the electromagnetic waves to the outside world.

Figure 3:
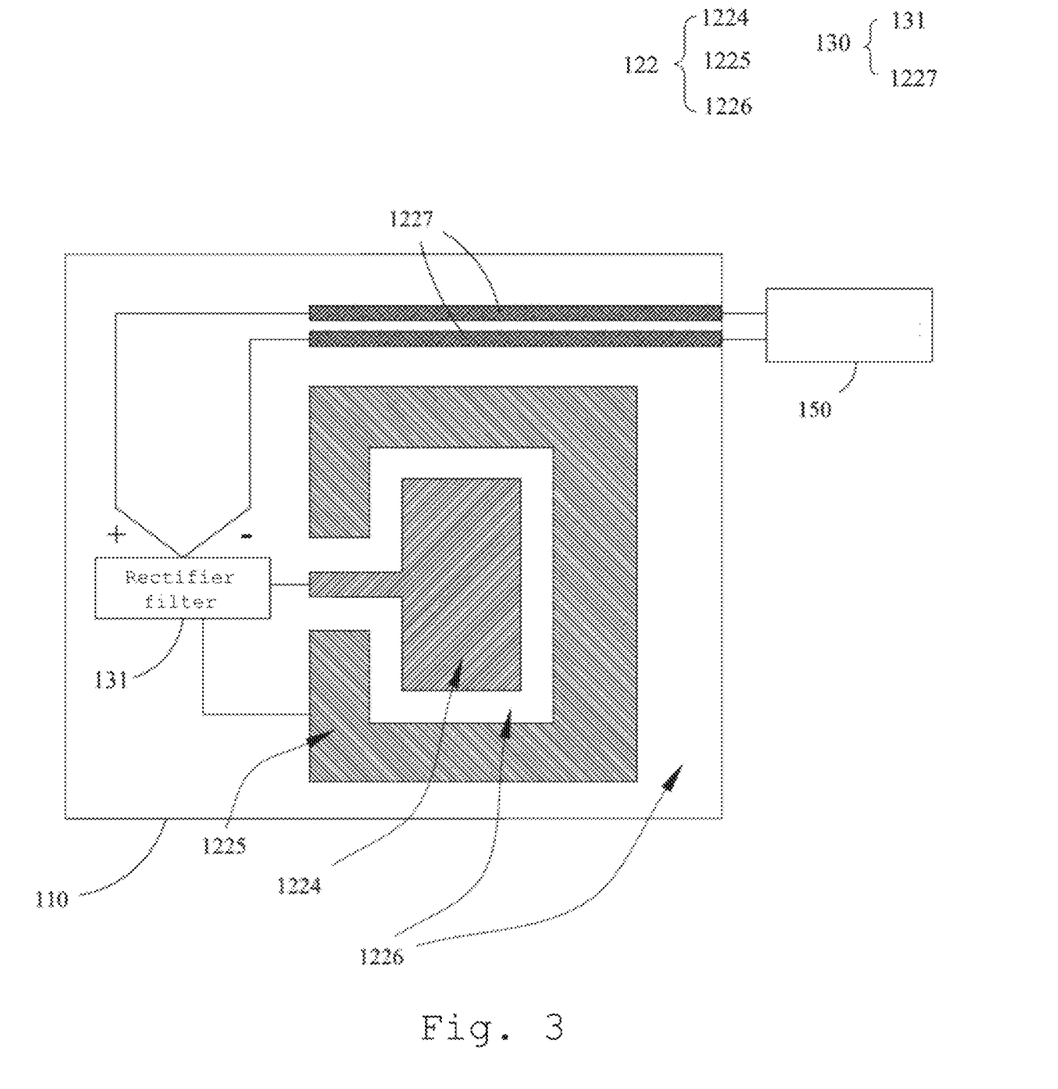
FIG. 3 is a schematic configuration diagram of a wireless energy conversion unit.

Afterwards, referring to FIG. 2A and FIG. 3 in combination, FIG. 3 is a schematic configuration diagram of the wireless energy conversion unit 100. Each antenna unit 122 in the antenna assembly 120 includes an energy receiving portion 1224, a grounding portion 1225, and a wiring portion 1226. The energy receiving portion 1224 is a metal line layer which is provided in the electrically active region and has a third light transmittance. Provided in the electrically active region, the grounding portion 1225 is a second metal line layer which is disposed around the energy receiving portion 1224 and has the third light transmittance. Moreover, the electrical energy processing module 130 includes at least a rectifier filter 131 and a DC power supply portion 1227 electrically connected to the rectifier filter 131. The rectifier filter 131 is electrically connected to the energy receiving portion 1224 of the antenna assembly 120. The rectifier filter 131 is used to receive indoor or outdoor electromagnetic waves via the energy receiving portion 1224 and implement rectification and filtering on the electromagnetic waves to convert the waves to DC electrical energy; and then the DC power supply portion 1227 outputs the electrical energy. Provided in the electrically active region, the DC power supply portion 1227 is a third metal line layer which has the third light transmittance and is connected to the optically variable assembly 150 to supply power. Provided in the non-electrically active region, the wiring portion 1226 has the third light transmittance and is formed by a plurality of conductor elements distributed between the energy receiving portion 1224 and the grounding portion 1225 and in the remaining region not containing the energy receiving portion 1224, the grounding portion 1225, and the DC power supply portion 1227. These conductor elements keep a first distance d1 from each other to be mutually insulated; and further keep a second distance d2 from the energy receiving portion 1224, the grounding portion 1225, and the DC power supply portion 1227 to be mutually insulated. The energy receiving portion 1224, the grounding portion 1225, and the DC power supply portion 1227 are separately a metal line layer shaped like a square grid, and these square grids are equally spaced. The first distance d1 and the second distance d2 are both fixed distances and equal to each other.

According to another embodiment of the present invention, the first distance d1 is non-fixed and the second distance d2 is fixed. Herein, the non-fixed distance means that the first distance d1 progressively increases by an equal length each time from any of the energy receiving portion 1224, the grounding portion 1225, and the DC power supply portion 1227 to outer edges of the substrate carrier 110. For example, the first distance d1 in the wiring portion 1226 close to the grounding portion 1225 progressively increases towards the outer edges by 1 μm each time.

Based on the foregoing description, the energy receiving portion 1224, the grounding portion 1225, and the DC power supply portion 1227 may each have a specific pattern. The sections (the electrically active region) in which the energy receiving portion 1224, the grounding portion 1225, and the DC power supply portion 1227 are located may have a light transmittance essentially identical with that of the wiring portion 1226 (the non-electrically active region). In some special design requirements, the energy receiving portion 1224, the grounding portion 1225, and the DC power supply portion 1227 may also have a light transmittance different from that of the wiring portion 1226. In addition, patterns of the energy receiving portion 1224, the grounding portion 1225, the DC power supply portion 1227, and the wiring portion 1226 are not specifically limited and may be of any shape, provided that the electrically active area and the non-electrically active area can be distinguished by their patterns.

According to an embodiment of the present invention, the energy receiving portion 1224 further includes a signal feed-in portion (not shown in the figure) which is a part, of a metal grid, straightly extending to an edge of the substrate carrier 110.

The antenna unit 122 may be an antenna line array which is formed by a plurality of antenna lines arranged in an array. These lines are integrated into a whole, and other same or similar elements are not described herein again. In addition, the antenna line array includes a plurality of groups of antennas. The antennas in each group are arranged in an array and include two energy receiving portions 1224 and a grounding portion 1225. An interval G is formed between every adjacent grounding portions 1225, so as to reduce the area of the grounding portion 1225 in each antenna, thus achieving desired energy conversion and receiving efficiency of the electromagnetic waves.

Moreover, the antenna unit 122 of the present invention may also be formed by a plurality of dipole antenna sets each including a pair of symmetrically arranged conductors, and two close ends of the conductors are respectively connected to feeder lines. When these dipole antenna sets are used as transmitting antennas, an electrical signal is fed into the conductors at the centers of the antennas; when they are used as receiving antennas, a received signal is acquired from the conductors also at the centers of the antennas. The dipole antenna sets and a diode may be in a series-parallel connection to receive electromagnetic waves with different polarities and from different directions, and the conversion efficiency can be adjusted by the series-parallel connection.

Figure 4A:
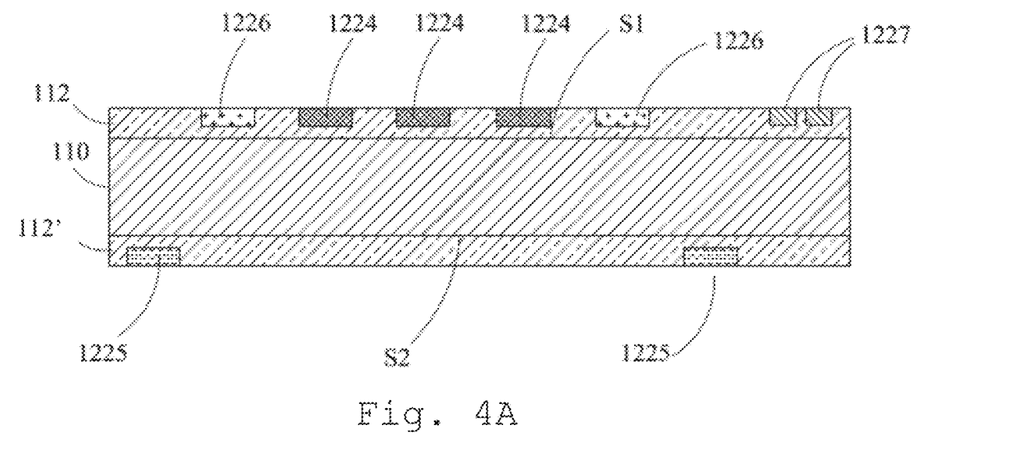
FIGS. 4A to 4G are schematic cross-sectional configuration diagrams of an energy receiving portion 1224, a grounding portion 1225, a DC power supply portion 1227, and a wiring portion 1226 in different embodiments.
Figure 4B:
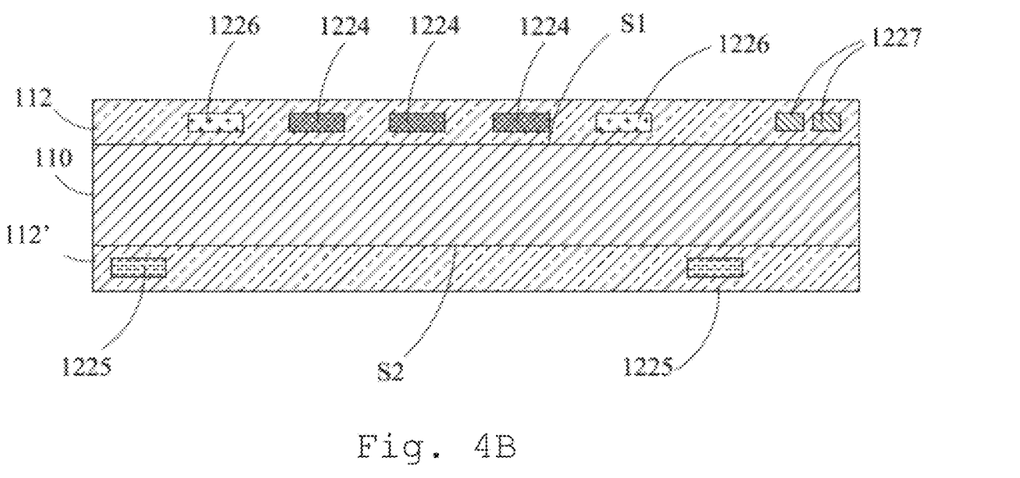
Figure 4C:
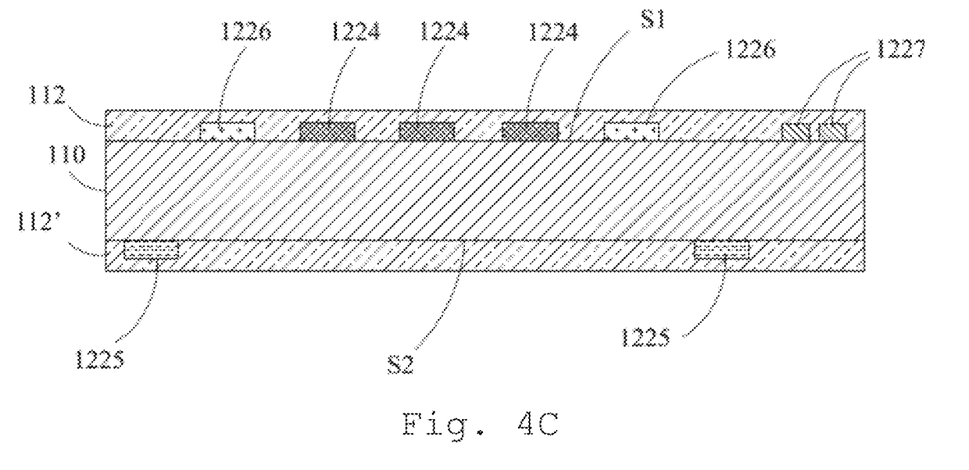

Based on the foregoing embodiments, refer to FIGS. 4A to 4C, which are schematic cross-sectional configuration diagrams of the energy receiving portion 1224, the grounding portion 1225, the DC power supply portion 1227, and the wiring portion 1226 in different embodiments.

In the embodiment shown in FIG. 4A, the substrate carrier 110 has an upper surface side S1 and an opposite lower surface side S2, and the first substrate layers 112 and 112' are respectively provided on the upper surface side S1 and the lower surface side S2. The energy receiving portions 1224 and the wiring portions 1226 in the antenna assembly 120, and the DC power supply portions 1227 of the electrical energy processing module 130 are all disposed away from the upper surface side of the substrate carrier 110 in the first substrate layer 112. The grounding portions 1225 in the antenna assembly 120 are disposed away from the lower surface side of the substrate carrier 110 in the first substrate layer 112'. In addition, none of the energy receiving portions 1224, the grounding portions 1225, the wiring portions 1226, and the DC power supply portions 1227 contacts the substrate carrier 110.

In the embodiment shown in FIG. 4B, the substrate carrier 110 has an upper surface side S1 and an opposite lower surface side S2, and the first substrate layers 112 and 112' are respectively provided on the upper surface side S1 and the lower surface side S2. The energy receiving portions 1224 and the wiring portions 1226 in the antenna assembly 120, and the DC power supply portions 1227 of the electrical energy processing module 130 are all provided inside the first substrate layer 112; and the grounding portions 1225 in the antenna assembly 120 are provided inside the first substrate layer 112'. In addition, none of the energy receiving portions 1224, the grounding portions 1225, the wiring portions 1226, and the DC power supply portions 1227 contacts the substrate carrier 110.

In the embodiment shown in FIG. 4C, the substrate carrier 110 has an upper surface side S1 and an opposite lower surface side S2, and the first substrate layers 112 and 112' are respectively provided on the upper surface side S1 and the lower surface side S2. The energy receiving portions 1224 and the wiring portions 1226 in the antenna assembly 120, and the DC power supply portions 1227 of the electrical energy processing module 130 are all disposed near the upper surface side of the substrate carrier 110 in the first substrate layer 112. The grounding portions 1225 in the antenna assembly 120 are disposed near the lower surface side of the substrate carrier 110 in the first substrate layer 112'. In addition, the energy receiving portions 1224, the grounding portions 1225, the wiring portions 1226, and the DC power supply portions 1227 all contact the substrate carrier 110.

Figure 4D:
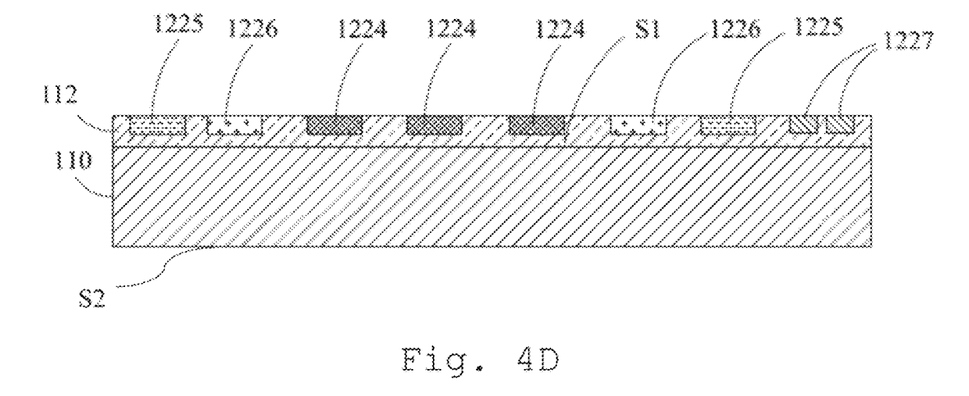
Figure 4E:
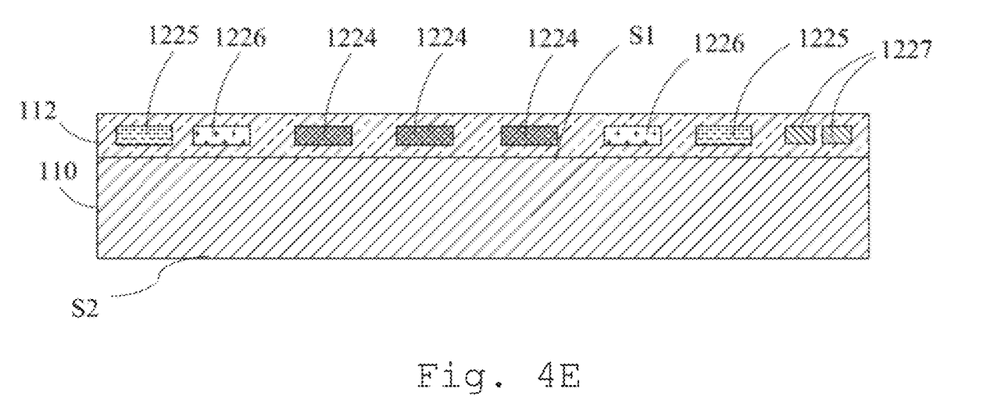
Figure 4F:
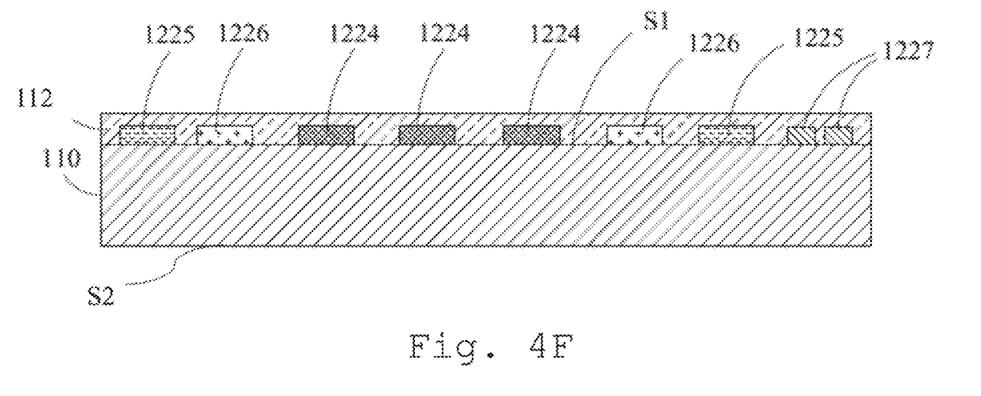

Refer to FIGS. 4D to 4F, which are schematic cross-sectional configuration diagrams of the energy receiving portion 1224, the grounding portion 1225, the DC power supply portion 1227, and the wiring portion 1226 in different embodiments.

In the embodiment shown in FIG. 4D, the substrate carrier 110 has an upper surface side S1 and an opposite lower surface side S2. The energy receiving portions 1224, the grounding portions 1225, and the wiring portions 1226; and the DC power supply portions 1227 of the electrical energy processing module 130 are all disposed away from the upper surface side of the substrate carrier 110 in the first substrate layer 112; and none of them contacts the substrate carrier 110.

In the embodiment shown in FIG. 4E, the substrate carrier 110 has an upper surface side S1 and an opposite lower surface side S2. The first substrate layer 112 is provided only on the upper surface side S1. The energy receiving portions 1224, the grounding portions 1225, and the wiring portions 1226 in the antenna assembly 120, and the DC power supply portions 1227 of the electrical energy processing module 130 are all provided inside the first substrate layer 112; and none of them contacts the substrate carrier 110.

In the embodiment shown in FIG. 4F, the substrate carrier 110 has an upper surface side S1 and an opposite lower surface side S2. The first substrate layer 112 is provided only on the upper surface side S1. The energy receiving portions 1224, the grounding portions 1225, and the wiring portions 1226 in the antenna assembly 120, and the DC power supply portions 1227 of the electrical energy processing module 130 are all disposed near the upper surface side of the substrate carrier 110 in the first substrate layer 112; and all of them contact the substrate carrier 110.

The first substrate layer 112 is integrated on the substrate carrier 110 in a removable manner. For example, the first substrate layer 112 is adhesive and can be attached to the substrate carrier 110. Specifically, the first substrate layer 112 is attached to the upper surface side and the opposite lower surface side of the substrate carrier 110 via an OCA.

Moreover, the energy receiving portion 1224, the grounding portion 1225, the wiring portion 1226, and the DC power supply portion 1227 are film layers made from any of ITO, graphene, nano-silver paste, copper wires, and silver alloy by means of patterning processing. The substrate carrier 110 and the first substrate layer 112 may be made from PET or a PI thin film, but the present invention is not limited thereto.

According to an embodiment of the present invention, the first substrate layer 112 has a designated thickness which preferably ranges from 0.05 mm to 2 mm. The metal line layers respectively forming the energy receiving portion 1224 and the grounding portion 1225 separately have a sheet resistance of less than 2 ohms, but the present invention is not limited thereto.

Figure 4G:
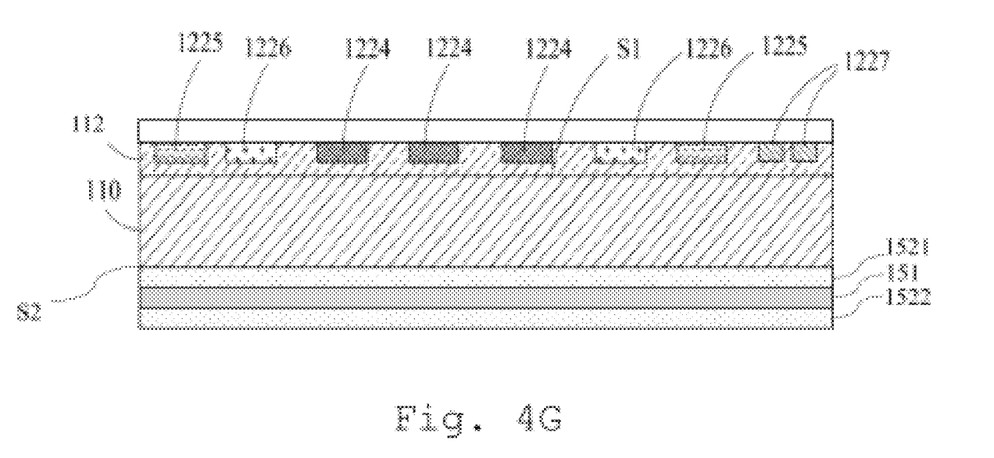

Further referring to FIG. 4G, FIG. 4G illustrates a cross-sectional structure of another embodiment of the present invention by using the structure in FIG. 2A as an example. This embodiment mainly differs from the structure in FIG. 2A in that: a second substrate layer 124 having the first light transmittance is further provided on the outermost surface of the electromagnetic wave shielding film and covers the first substrate layer 112 and/or the outermost surface of the optically variable assembly 150, so as to protect the antenna assembly 120, the electrical energy processing module 130, and the optically variable assembly 150 against scratching or abrasion. The second substrate layer 124 may be a protective layer meeting the pencil hardness specification of greater than 5H; and is made from, for example, a hardened silicon nitride coating or PET. It should be additionally noted that, the structures in the embodiments shown from FIGS. 4B to 4F may also be provided with the second substrate layer 124, and the details are not described herein.

In the foregoing embodiments, the wiring portion 1226 is formed by a plurality of conductor elements which are pervious to light and mutually electrically insulated. These conductor elements are spaced by a given distance to achieve electrical insulation, that is, an open circuit is formed between the conductor elements. Due to the electrical insulation between the conductor elements, the wiring portion 1226 cannot collect the electromagnetic waves. The wiring portion 1226 is mainly used to minimize the difference in light transmittance between different portions when light passes through the antenna units 122 of the present invention, or even equalize the light transmittances. For example, the antenna units 122 are formed on the first substrate layer 112, and there are different light transmittances when the light passes through the foregoing transparent substrates and the antenna units 122. Without arrangement of the wiring portion 1226, regions between every two antennas are only provided with the first substrate layer 112, and therefore the light transmittance produced when the light passes through only the first substrate layer 112 is obviously greater than that when the wiring portion 1226 is disposed. Consequently, when the antenna units 122 are attached to the substrate carrier 110, visually bright and dark regions are generated, affecting the original visual effect of the substrate carrier. However, with arrangement of the transparent wiring portion 1226, after the light passes through the wiring portion 1226 and the first substrate layer 112, the difference in brightness caused when the antenna units of the present invention are applied in the substrate carrier 110 can be greatly reduced via the disposed wiring portion 1226 and by an appropriate pattern design of the wiring portion 1226. Thus, even when the antenna units of the present invention are attached to the substrate carrier 110, the original visual effect of the substrate carrier 110 is not affected. Moreover, parts of the energy receiving portion 1224, the grounding portion 1225, the wiring portion 1226, and the DC power supply portion 1227 that are away from the surface of the first substrate layer 112 may be further provided with an ink layer (not shown in the figure). The ink layer is mainly used to reduce the metallic colors in the energy receiving portion 1224, the grounding portion 1225, the wiring portion 1226, and the DC power supply portion 1227. For example, metal lines made from silver paste are visually greyish, ink with a relatively low light transmittance may be applied thereon to make the color dark and uniform.

In other embodiments of the present invention, the antenna assembly 120 includes m (m≥2) antenna units 122, and the electrical energy processing module 130 includes m rectifier filters 131. The energy receiving portions 1224 in the antenna units 122 and the DC power supply portions 1227 of the electrical energy processing module 130 may be connected to the rectifier filters 131 in parallel or in series, to output power to the optically variable assembly 150. It should be additionally noted that the foregoing connection manner may also be a combination of series and parallel connections.

In the electromagnetic wave shielding film described in the foregoing embodiments, the substrate carrier 110 may be of a flat-plate structure, and the antenna assembly 120 is a flat antenna unit fed by using coplanar waveguide (CPW).

In addition, because the antenna usually contains a non-linear device such as an amplifier at the front end, a large number of harmonic components are generated. If the antenna cannot suppress harmonics, the harmonic components may be sent out by the antenna, causing severe electromagnetic interference; or harmonic energy is delivered to the system by a receiving antenna, causing degradation of system performance. Therefore, based on the antenna units in the foregoing embodiments, the energy receiving portion 1224 further includes a resonant filtering circuit provided in a metal line layer having the second light transmittance, to structurally integrate the resonant filtering circuit and the energy receiving portion 1224, such that the antenna units can filter out the harmonics while radiating energy. In this embodiment, the resonant filtering circuit embedded in the antenna unit may be of a U-shaped resonant structure. Such a resonant structure can realize bandstop filtering for specific frequencies, provided that its length meets a quarter of the wavelength at a resonant frequency. The resonant filtering circuit can effectively suppress second-order or third-order harmonic energy, improving the conversion efficiency from the electromagnetic waves to the DC electrical energy.

Figure 5A:
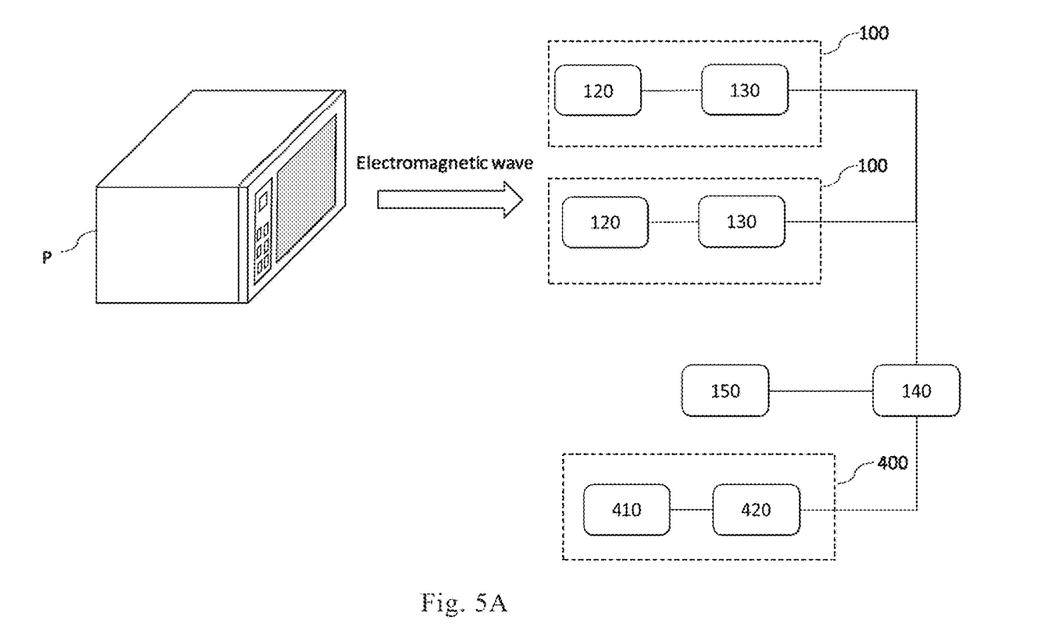
FIGS. 5A and 5B are schematic block diagrams of several application embodiments of the electromagnetic wave shielding film having a wireless energy conversion function in the present invention.
Figure 5B:
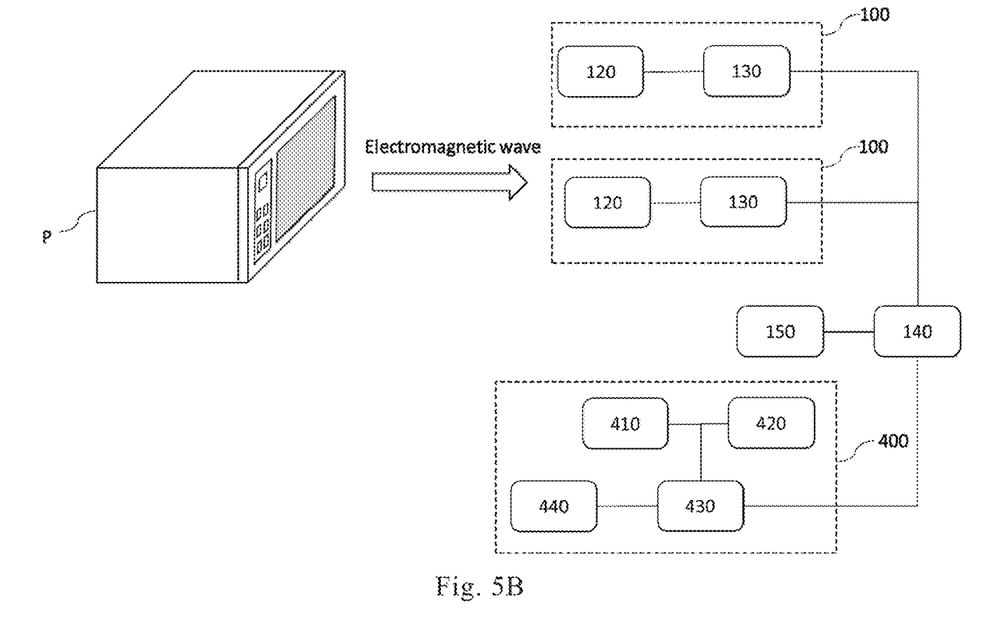

Further, refer to FIGS. 5A and 5B, which are structural configuration diagrams of other embodiments of the present invention. In the embodiment shown in FIG. 5A, the electromagnetic wave shielding film further includes an electrical energy storage module 140 and a real-time display unit 400. The electrical energy storage module 140 is electrically connected to the electrical energy processing module 130, and is used to store the DC electrical energy from the electrical energy processing module 130 and supply the electrical energy to the optically variable assembly 150 and the real-time display unit 400. The real-time display unit 400 includes at least a display module 410 and a sensing module 420. The sensing module 420 is disposed at a side of the electromagnetic wave shielding film or on the exterior surface of the first substrate layer 112; and can sense the temperature inside a microwave oven P, capture a real-time interior image of the microwave oven, and transmit the image to the display module 410. The display module 410 may be a low-consumption liquid crystal display (LCD) or an electronic paper display screen, and is disposed on the exterior surface of the optically variable assembly. The display module can display the temperature information and the interior image of the microwave oven P in real time, such that the user can timely confirm an operation status of the microwave oven.

Moreover, in the embodiment shown in FIG. 5B, the real-time display unit 400 further includes a microcontroller 430 and a wireless transceiver module 440. The microcontroller 430 is used to receive the temperature information measured by the sensing module 420, and control operation of the microwave oven by a communicative connection between the wireless transceiver module 440 and the microwave oven P. When the sensing module 420 detects that the temperature inside the microwave oven P is abnormal, the microcontroller 430 sends out a control instruction to stop the operation of the microwave oven P, avoiding occurrence of an unexpected hazard.

In the foregoing embodiments, the rectifier filter 131 of the electrical energy processing module 130 and the electrical energy storage module 140 are disposed in the first substrate layer 112, but the present invention is not limited thereto. Because the rectifier filter 131 and the electrical energy storage module 140 are not necessarily made of a transparent material, they can be disposed at a side of the first substrate layer and/or the substrate carrier 110, instead of on the first substrate layer 112, thus avoiding adversely affecting the light transmittance and the appearance.

To sum up, the electromagnetic wave shielding film of the present invention integrates three functions of shielding, recycling, and reuse of electromagnetic waves. In the present invention, an antenna assembly is used to convert the electromagnetic waves (from the front surface of the oven door or the door gaps on the periphery) emitted by the microwave oven to DC electrical energy which can drive the optically variable assembly and the real-time display unit, thus ensuring the safety during use by a user.

The technical content of the present invention has been disclosed above by preferred embodiments, and is not intended to limit the present invention. Some changes or modifications made without departing from the spirit of the present invention by those skilled in the art all fall within the scope of the present invention. Therefore, the scope of protection of the present invention shall be subject to the scope defined by the appended claims.

MEANINGS OF THE NUMERALS

100. Wireless energy conversion unit
110. Substrate carrier
112, 112'. First substrate layer
120. Antenna assembly
122. Antenna unit
1224. Energy receiving portion
1225. Grounding portion
1226. Wiring portion
124. Second substrate layer
130. Electrical energy processing module
131. Rectifier filter
1227. DC power supply portion
140. Electrical energy storage module
150. Optically variable assembly
151. Electrochromic layer
152. Electrode layer
1521. First electrode layer
1522. Second electrode layer
400. Real-time display unit
410. Display module
420. Sensing module
430. Microcontroller
440. Wireless transceiver module
S1. First surface
S2. Second surface
P. Microwave oven

What is claimed is:

1. An electromagnetic wave shielding film having a wireless energy conversion function, attached to an exterior surface of a door of a microwave oven and used to absorb electromagnetic waves released by the microwave oven during operation, wherein the electromagnetic wave shielding film comprises:

a substrate carrier having a first light transmittance;
a first substrate layer, provided on one other side of the substrate carrier and having a second light transmittance ranging from 50% to 95%, wherein a wireless energy conversion unit is provided in the first substrate layer and is used to receive the electromagnetic waves and convert the electromagnetic waves to direct current (DC) electrical energy; and
an optically variable assembly, provided on a other side of the substrate carrier and electrically connected to the wireless energy conversion unit, wherein the optically variable assembly comprises an electrochromic layer and an electrode layer; and the electrode layer is electrically connected to the wireless energy conversion unit and the electrochromic layer, and is used to receive the DC electrical energy from the wireless energy conversion unit and drive the electrochromic layer to change its light transmission property, wherein the wireless energy conversion unit comprises an antenna assembly and an electrical energy processing module;

the antenna assembly is formed by a plurality of antenna units capable of transmitting and receiving the electromagnetic waves; the antenna units are arranged in an array and each comprise an energy receiving portion, a grounding portion, and a wiring portion which are disposed in the first substrate layer; the energy receiving portion is formed by arranging a first metal line layer, and the grounding portion is disposed around the energy receiving portion and formed by arranging a second metal line layer;

the electrical energy processing module comprises a rectifier filter and a DC power supply portion; the rectifier filter is electrically connected to the energy receiving portion of the antenna assembly, and is used to receive the electromagnetic waves from the antenna assembly and implement rectification and filtering on the electromagnetic waves to convert the waves to DC electrical energy; the DC power supply portion is formed by arranging a third metal line layer, is electrically connected to the rectifier filter and the optically variable assembly, and is used to receive the DC electrical energy and output it to the optically variable assembly;

the wiring portion in the antenna assembly is distributed between the energy receiving portion and the grounding portion and in the remaining region not containing the energy receiving portion, the grounding portion, and the DC power supply portion; the wiring portion comprises a plurality of conductor elements; these conductor elements keep a first distance from each other to be mutually insulated, and further keep a second distance from the energy receiving portion, the grounding portion, and the DC power supply portion to be mutually insulated; and the second light transmittance (T2) of the first substrate layer and the first light transmittance (T1) of the substrate carrier meet a following relational expression:

$-10\% \leq T1-T2 \leq +10\%$.

2. The electromagnetic wave shielding film having a wireless energy conversion function of claim 1, further comprising: a real-time display unit electrically connected to the wireless energy conversion unit, wherein the real-time display unit comprises a display module and a sensing module; the sensing module is used to sense the temperature inside the microwave oven, capture a real-time interior image of the microwave oven, and transmit the image to the display module for real-time display.

3. The electromagnetic wave shielding film having a wireless energy conversion function of claim 2, wherein the real-time display unit further comprises a microcontroller and a wireless transceiver module; and the microcontroller is used to receive the temperature information measured by the sensing module, and control operation of the microwave oven by a communicative connection between the wireless transceiver module and the microwave oven.

4. The electromagnetic wave shielding film having a wireless energy conversion function of claim 1, wherein the first metal line layer, the second metal line layer, and the third metal line layer which respectively form the energy receiving portion, the grounding portion, and the DC power supply portion have equal fixed or mutually unequal widths.

5. The electromagnetic wave shielding film having a wireless energy conversion function of claim 1, wherein the first metal line layer, the second metal line layer, and the third metal line layer which respectively form the energy receiving portion, the grounding portion, and the DC power supply portion crisscross to respectively form square grids having equal or unequal side lengths.

6. The electromagnetic wave shielding film having a wireless energy conversion function of claim 1, wherein the first distance between the conductor elements progressively increases cumulatively by an equal length from any of the energy receiving portion, the grounding portion, and the DC power supply portion to outer edges of the substrate carrier.

7. The electromagnetic wave shielding film having a wireless energy conversion function of claim 1, wherein the energy receiving portion, the grounding portion, the DC power supply portion, and the wiring portion are together provided in the first substrate layer and none of them contacts the substrate carrier.

8. The electromagnetic wave shielding film having a wireless energy conversion function of claim 1, wherein the energy receiving portion, the grounding portion, the DC power supply portion, and the wiring portion are together disposed in the first substrate layer and all contact the substrate carrier.

9. The electromagnetic wave shielding film having a wireless energy conversion function of claim 1, wherein an upper surface side and a lower surface side of the substrate carrier are respectively provided with the first substrate layer; and the energy receiving portion, the DC power supply portion, and the wiring portion are together disposed in the first substrate layer on the upper surface side, while the grounding portion is disposed in the first substrate layer on the lower surface side.

10. The electromagnetic wave shielding film having a wireless energy conversion function of claim 9, wherein none of the energy receiving portion, the DC power supply portion, and the wiring portion disposed at the upper surface side contacts the substrate carrier, and neither does the grounding portion disposed at the lower surface side.

11. The electromagnetic wave shielding film having a wireless energy conversion function of claim 9, wherein the energy receiving portion, the DC power supply portion, and the wiring portion disposed at the upper surface side all contact the substrate carrier, and so does the grounding portion disposed at the lower surface side.

12. The electromagnetic wave shielding film having a wireless energy conversion function of claim 1, wherein the first metal line layer, the second metal line layer, and the third metal line layer are made from any of indium tin oxide (ITO), graphene, nano-silver paste, copper wires, and silver alloy; the substrate carrier and the first substrate layer are made from glass, polyethylene terephthalate (PET), or a polyimide (PI) thin film; and the first substrate layer is attached to the substrate carrier via an optical clear adhesive (OCA).

13. The electromagnetic wave shielding film having a wireless energy conversion function of claim 1, wherein the first substrate layer has a thickness ranging from 0.05 mm to 2 mm; and the first metal line layer, the second metal line layer, and the third metal line layer separately have a sheet resistance of less than 2 ohms.

14. The electromagnetic wave shielding film having a wireless energy conversion function of claim 1, wherein the first substrate layer is made from glass and has a plurality of grooves formed by means of physical or chemical etching; and the first metal line layer, the second metal line layer, and the third metal line layer are generated in these grooves by means of physical or chemical deposition to respectively form the energy receiving portion, the grounding portion, and the DC power supply portion.

15. The electromagnetic wave shielding film having a wireless energy conversion function of claim 1, further comprising: a second substrate layer having the first light transmittance, wherein the second substrate layer is provided on the outermost side of the electromagnetic wave shielding film and meets the pencil hardness specification of greater than 5H, so as to protect the internal components of the electromagnetic wave shielding film against scratching or abrasion.

16. The electromagnetic wave shielding film having a wireless energy conversion function of claim 1, wherein the energy receiving portion further comprises a resonant filtering circuit, which is provided in the first metal line layer and used to enable the energy receiving portion to filter out harmonics while radiating energy.

17. The electromagnetic wave shielding film having a wireless energy conversion function of claim 1, wherein the wireless energy conversion unit further comprises an electrical energy storage module connected to the DC power supply portion, and the electrical energy storage module is used to store the electrical energy obtained after conversion of the electromagnetic waves received by the antenna assembly.

* * * * *